US012800939B2

(12) United States Patent
Chen et al.

(10) Patent No.: US 12,800,939 B2
(45) Date of Patent: Nov. 17, 2026

(54) HEAD-MOUNTED DISPLAY

(71) Applicant: Coretronic Corporation, Hsin-Chu (TW)

(72) Inventors: Yao-Hung Chen, Hsin-Chu (TW); Wei-Min Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 237 days.

(21) Appl. No.: 18/433,428

(22) Filed: Feb. 6, 2024

(65) Prior Publication Data

US 2025/0076664 A1 Mar. 6, 2025

(30) Foreign Application Priority Data

Feb. 9, 2023 (CN) ........................ 202310087383.X

(51) Int. Cl.
*G02B 27/01* (2006.01)

(52) U.S. Cl.
CPC .. *G02B 27/0176* (2013.01); *G02B 2027/0178* (2013.01)

(58) Field of Classification Search
CPC ........ G02B 27/0176; G02B 2027/0178; G02B 27/0172; G02B 27/01; H05K 7/2039
USPC ........................................................ 359/630
See application file for complete search history.

(56) References Cited

U.S. PATENT DOCUMENTS

| | | | | |
|---|---|---|---|---|
| 10,156,726 | B2 | 12/2018 | Hurbi et al. | |
| 10,935,830 | B1 * | 3/2021 | Cho | G02F 1/13306 |
| 2021/0364861 | A1 * | 11/2021 | Lum | G02F 1/133601 |
| 2025/0240362 | A1 * | 7/2025 | Durning | H04M 1/0266 |
| 2025/0261484 | A1 * | 8/2025 | Zhang | H10H 20/821 |

FOREIGN PATENT DOCUMENTS

CN 213094752 4/2021

* cited by examiner

*Primary Examiner* — Mohammed A Hasan
(74) *Attorney, Agent, or Firm* — JCIPRNET

(57) ABSTRACT

A head-mounted display, which includes a case body, a heat source, and a thermally conductive material layer. The heat source and the thermally conductive material layer are disposed in the case body. The heat source is connected to the case body through the thermally conductive material layer. The case body has a first surface connected to the thermally conductive material layer and an opposite second surface. The thermally conductive material layer has a third surface connected to the heat source and an opposite fourth surface. A first distance is greater than a second distance, in which the first distance is a distance from the third surface adjacent to the heat source toward the second surface, and the second distance is a distance from the third surface away from the heat source toward the second surface. In this way, the internal heat of the head-mounted display can be uniformly distributed.

9 Claims, 8 Drawing Sheets

10

10

HEAD-MOUNTED DISPLAY

CROSS-REFERENCE TO RELATED APPLICATION

This application claims the priority benefit of China application serial no. 202310087383.X, filed on Feb. 9, 2023. The entirety of the above-mentioned patent application is hereby incorporated by reference herein and made a part of this specification.

BACKGROUND

Technical Field

The disclosure relates to a display, and in particular to a head-mounted display.

Description of Related Art

Augmented reality (AR) glasses are products that will be in contact with human skin for a long time, and the comfortable temperature of the human body should be lower than 39 degrees, so the product surface temperature should not be higher than 48 degrees according to regulations. Since eyewear products are closer to the ears, installing a fan will make the user experience less favorable. In addition, AR glasses consume little power, and most of the heat dissipation solutions are to install uniform temperature materials on the side walls of the casing and dissipate heat through natural convection. However, due to the thermal resistance of the uniform temperature material itself, even with the uniform temperature material, there will still be local hot spots, resulting in AR glasses products that do not meet the regulations. If the problem of local hot spots is to be reduced, the thermal conductivity of the uniform temperature material needs to be as high as possible. However, using a material with a high thermal conductivity usually means a high cost in the heat dissipation design.

The information disclosed in this background section is only for enhancement of understanding of the background of the described technology and therefore it may contain information that does not form the prior art that is already known to a person of ordinary skill in the art. Further, the information disclosed in this background section does not mean that one or more problems to be resolved by one or more embodiments of the disclosure is acknowledged by a person of ordinary skill in the art.

SUMMARY

The disclosure provides a head-mounted display which can uniformly distribute the internal heat.

Other purposes and advantages of the disclosure may be further understood from the technical features disclosed in the disclosure.

In order to achieve one or part or all of the above objectives or other objectives, an embodiment of the disclosure provides the head-mounted display, which includes a case body, a heat source, and a thermally conductive material layer. The heat source and the thermally conductive material layer are disposed in the case body. The heat source is connected to the case body through the thermally conductive material layer. The case body has a first surface connected to the thermally conductive material layer and an opposite second surface. The thermally conductive material layer has a third surface connected to the heat source and an opposite fourth surface. A first distance is greater than a second distance, in which the first distance is a distance between the third surface and the second surface adjacent to the heat source, and the second distance is a distance between the third surface and the second surface away from the heat source.

Based on the above, in the head-mounted display according to an embodiment of the disclosure, since the heat source is connected to the case body through the thermally conductive material layer and the head-mounted display is designed such that the first distance is greater than the second distance, the head-mounted display improves the situation of uneven system temperature, so that the internal heat can be uniformly distributed to the case body and the head-mounted display is enabled to meet the production regulations.

Other objectives, features, and advantages of the disclosure will be further understood from the further technological features disclosed by the embodiments of the disclosure, in which there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as “top,” “bottom,” “front,” “back,” etc., is used with reference to the orientation of the drawings being described. The components of the disclosure may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
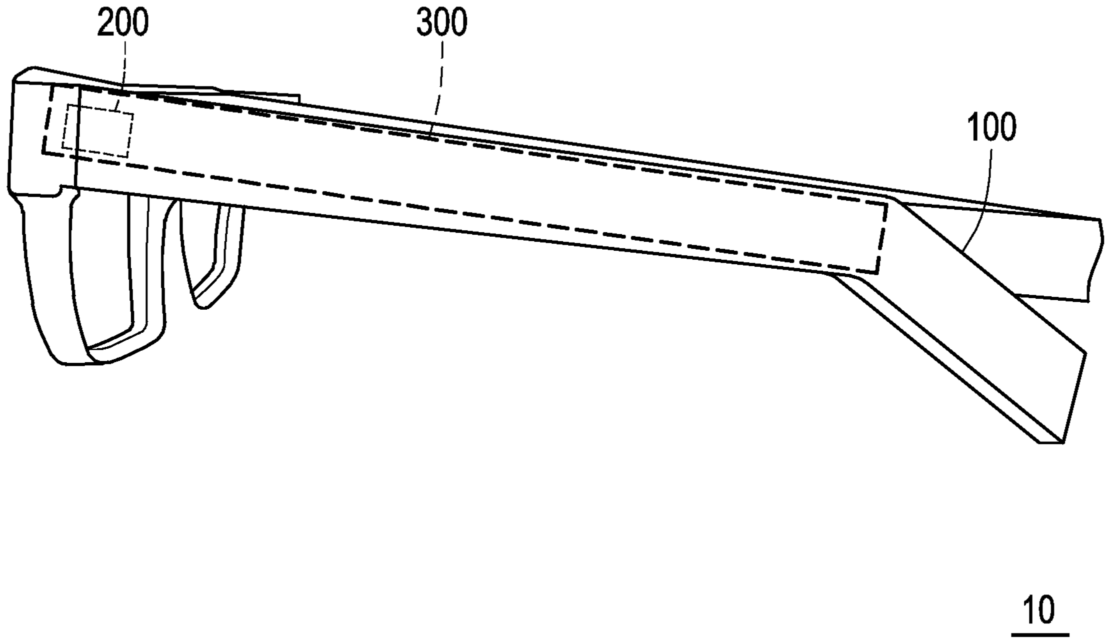
FIG. 1A is a schematic perspective view of a head-mounted display according to the first embodiment of the disclosure.
Figure 1B:
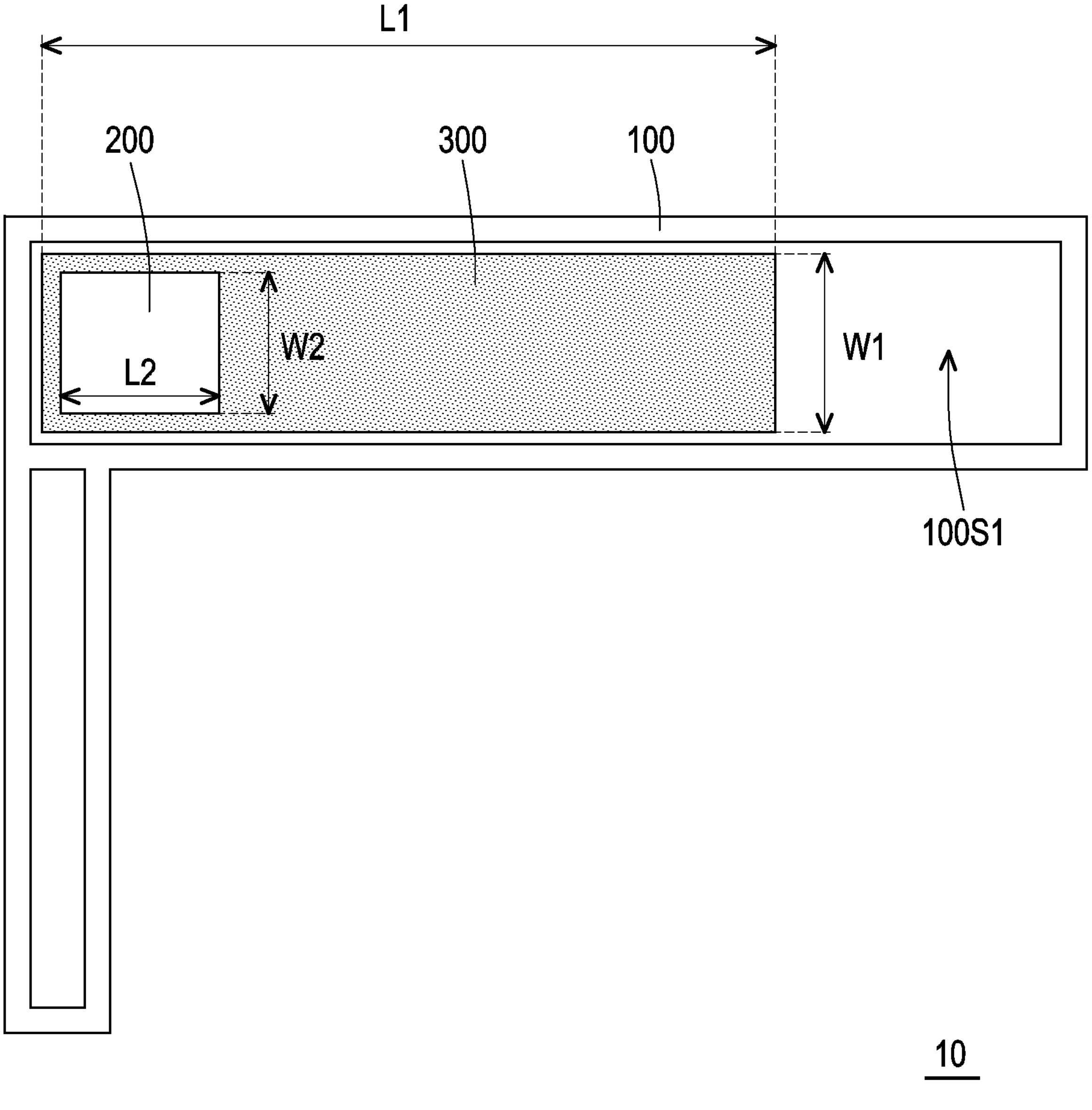
FIG. 1B is a side cross-sectional view of FIG. 1A.
Figure 1C:
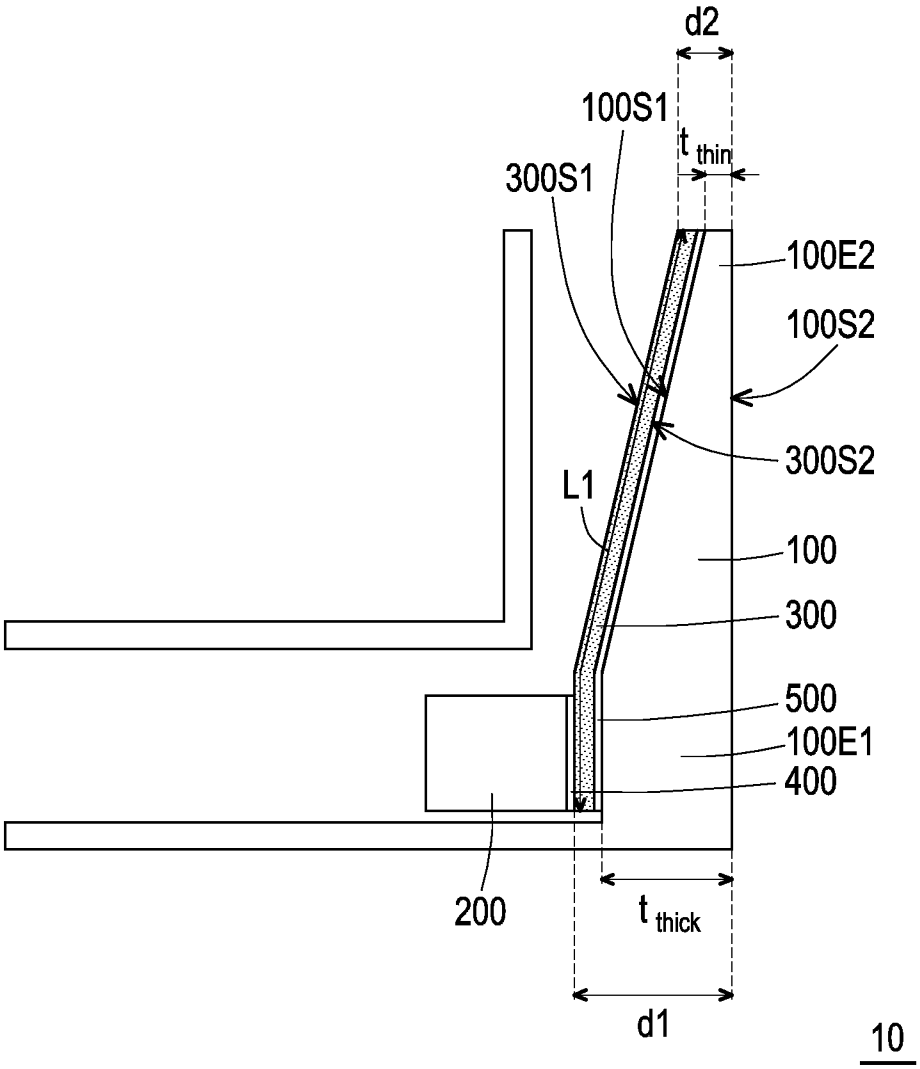
FIG. 1C is a top cross-sectional view of FIG. 1A.

FIG. 1A is a schematic perspective view of a head-mounted display according to the first embodiment of the disclosure. FIG. 1B is a side cross-sectional view of FIG. 1A. FIG. 1C is a top cross-sectional view of FIG. 1A. Please refer to FIG. 1A to FIG. 1C. An embodiment of the disclosure provides a head-mounted display 10, which includes a case body 100, a heat source 200, and a thermally conductive material layer 300.

In this embodiment, the heat source 200 is, for example, a light source, a light valve, a system chip, and the like. The thermally conductive material layer 300 is, for example, graphite, stone-ground composite material, aluminum foil, copper foil, heat pipe, vapor chamber, and the like.

In this embodiment, the heat source 200 and the thermally conductive material layer 300 are disposed in the case body 100. Taking FIG. 1A as an example, the case body 100 may be shaped like a spectacle frame, which may include lens frame parts and spectacle frame leg parts. The thermally conductive material layer 300 is disposed at the spectacle frame leg parts.

In this embodiment, the heat source 200 is connected to the case body 100 through the thermally conductive material layer 300. The case body 100 has a first surface 100S1 connected to the thermally conductive material layer 300 and an opposite second surface 100S2. The case body 100 has the first surface 100S1, the first surface 100S1 is connected to the thermally conductive material layer 300, and the second surface 100S2 is opposite to the first surface 100S1. The thermally conductive material layer 300 has a third surface 300S1 connected to the heat source 200 and an opposite fourth surface 300S2. A first distance d1 is greater than a second distance d2. The first distance d1 is a distance between the third surface 300S1 and the second surface 100S2 adjacent to the heat source 200, and the second distance d2 is a distance between the third surface 300S1 and the second surface 100S2 away from the heat source 200. That is to say, the first distance d1 is a distance from the third surface 300S1 adjacent to the heat source 200 toward the second surface 100S2, and the second distance d2 is a distance from the third surface 300S1 away from the heat source 200 toward the second surface 100S2.

In this embodiment, a length L1 of the thermally conductive material layer 300 is greater than or equal to a length L2 of the heat source, and a width W1 of the thermally conductive material layer 300 is greater than or equal to a width W2 of the heat source, as shown in FIG. 1B. Moreover, an area of the thermally conductive material layer 300 is greater than or equal to an area of the heat source 200. The length may be defined as a cumulative distance in a direction from a first end 100E1 of the case body 100 to a second end 100E2, and a width may be defined as a distance perpendicular to the length direction and perpendicular to a direction from the third surface 300S1 toward the second surface 100S2. The area may be defined as the length multiplied by the width, the first end 100E1 is an end of the case body 100 adjacent to the heat source 200, and the second end 100E2 is an end of the case body 100 away from the heat source 200.

In this embodiment, the head-mounted display 10 further includes a first thermal interface material (TIM) layer 400 disposed between the thermally conductive material layer 300 and the heat source 200. Main components of the first thermal interface material (TIM) layer 400 are base material and filling material; the base material provides the ability to fill gaps, mostly soft and deformable materials, such as polysiloxane (polysiloxane or polymerized siloxane)/silicon; the purpose of the filling material is to increase the thermal conductivity of the base material, and the commonly used material is metal or ceramic powder.

In this embodiment, the head-mounted display 10 further includes a second thermal interface material (TIM) layer 500 disposed between the thermally conductive material layer 300 and the case body 100. A material of the second thermal interface material (TIM) layer 500 may be the same as the material of the first thermal interface material (TIM) layer 400.

In this embodiment, a thickness $t_{thick}$ of the case body 100 at the first end 100E1 is greater than a thickness $t_{thin}$ at the second end 100E2. Specifically, the thickness of the case body 100 gradually decreases from the first end 100E1 to the second end 100E2, that is, the thickness of the case body 100 gradually decreases from $t_{thick}$ to $t_{thin}$. Moreover, the thickness of the case body 100 decreases linearly from the first end 100E1 to the second end 100E2. The thickness may be defined as a distance in a direction perpendicular to the length direction and the width direction (i.e., the direction from the third surface 300S1 to the second surface 100S2).

In this embodiment, the head-mounted display 10 satisfies the following conditional formula: $1 \geq R_{thick}/(R_{thin}+R_{th}) > R_{thin}/(R_{thin}+R_{th})$, in which $R_{thick}$ is a thermal resistance of the case body 100 at the first end 100E1 (caused by a temperature difference between the first surface 100S1 and the second surface 100S2 adjacent to the heat source 200), $R_{thin}$ is a thermal resistance of the case body 100 at the second end 100E2 (caused by a temperature difference between the first surface 100S1 and the second surface 100S2 away from the heat source 200), and $R_{th}$ is a thermal resistance of the thermally conductive material layer 300 in the length direction (a temperature difference between a place adjacent to the heat source 200 and a place away from the heat source 200). In addition, when the value of $R_{thick}/(R_{thin}+R_{th})$ is close to 1, the temperature uniformity of the head-mounted display 10 is good. On the contrary, when the value of $R_{thick}/(R_{thin}+R_{th})$ is close to the value of $R_{thin}/(R_{thin}+R_{th})$, the temperature uniformity of the head-mounted display 10 is poor. Since $R_{thick}=t_{thick}/(k1\times W2\times L2)$, $R_{thin}=t_{thin}/(k1\times W2\times L2)$, and $R_{th}=L1/(k2\times W1\times t_{th})$, the conditional formula $1>R_{thick}/(R_{thin}+R_{th})>R_{thin}/(R_{thin}+R_{th})$ may be further expanded into the following conditional formula:

$$1 \geq \left(\frac{t_{thick}}{k1 \times W2 \times L2}\right) \Big/ \left(\frac{t_{thin}}{k1 \times W2 \times L2} + \frac{L1}{k2 \times W1 \times t_{th}}\right) > \left(\frac{t_{thin}}{k1 \times W2 \times L2}\right) \Big/ \left(\frac{t_{thin}}{k1 \times W2 \times L2} + \frac{L1}{k2 \times W1 \times t_{th}}\right)$$

k1 is a thermal conductivity of the case body 100, k2 is a thermal conductivity of the thermally conductive material layer 300, and $t_{th}$ is a thickness of the thermally conductive material layer 300.

Based on the above, in the head-mounted display 10 according to an embodiment of the disclosure, since the heat source 200 is connected to the case body 100 through the thermally conductive material layer 300 and the head-mounted display 10 is designed such that the first distance d1 is greater than the second distance d2, in the case of cost reduction, the head-mounted display 10 improves the situation of uneven system temperature, so that the internal heat can be uniformly distributed to the case body 100 and further the head-mounted display 10 is enabled to meet the production regulations.

In addition, in this embodiment, when the head-mounted display 10 is designed such that the length L1 of the thermally conductive material layer 300 is greater than or equal to the length L2 of the heat source and the width W1 of the thermally conductive material layer 300 is greater than or equal to the width W2 of the heat source, or disposing the first TIM layer 400 between the thermally conductive material layer 300 and the heat source 200, it helps to further improve the temperature uniformity of the head-mounted display 10.

Figure 2:
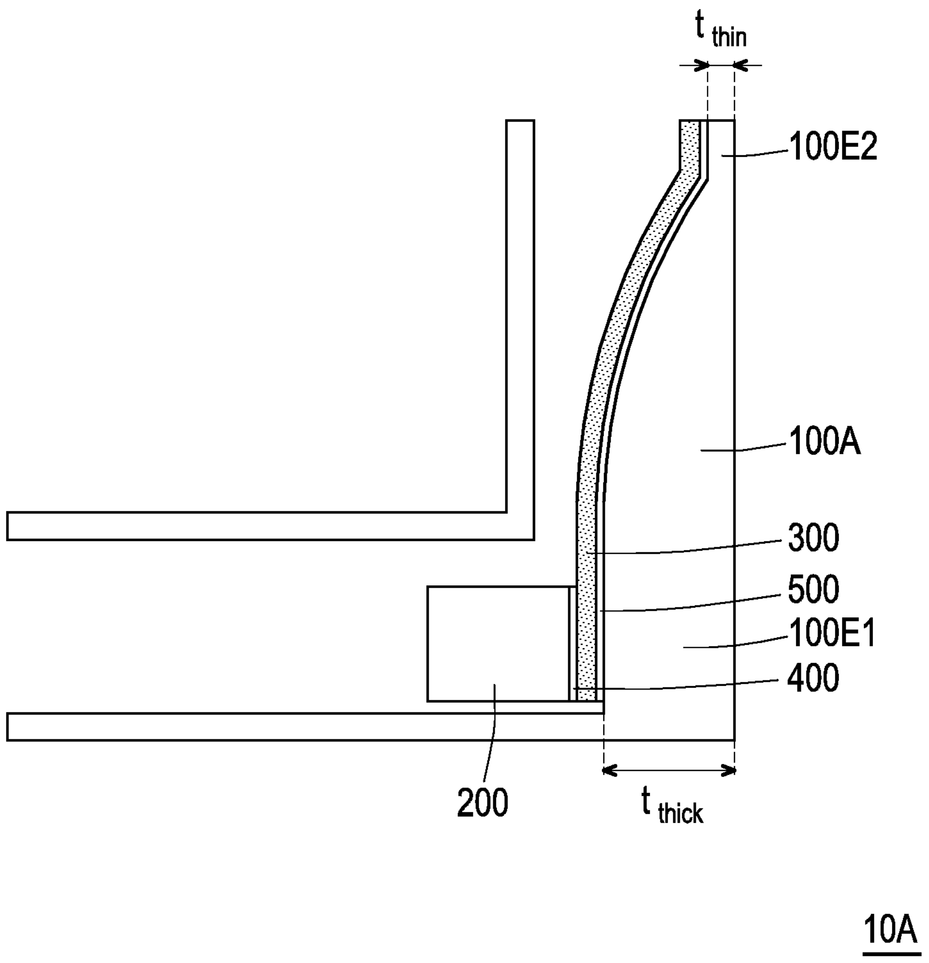
FIG. 2 is a top cross-sectional schematic view of a head-mounted display according to the second embodiment of the disclosure.

FIG. 2 is a top cross-sectional schematic view of a head-mounted display according to the second embodiment of the disclosure. Please refer to FIG. 2. A head-mounted display 10A is similar to the head-mounted display 10, and the main differences are as follows. In this embodiment, a thickness of a case body 100A of the head-mounted display 10A gradually decreases from the first end 100E1 to the second end 100E2, that is, the thickness gradually decreases from $t_{thick}$ to $t_{thin}$, for example, decreasing in an arc shape. The advantages of the head-mounted display 10A are similar to the head-mounted display 10, and will not be repeated here.

Figure 3:
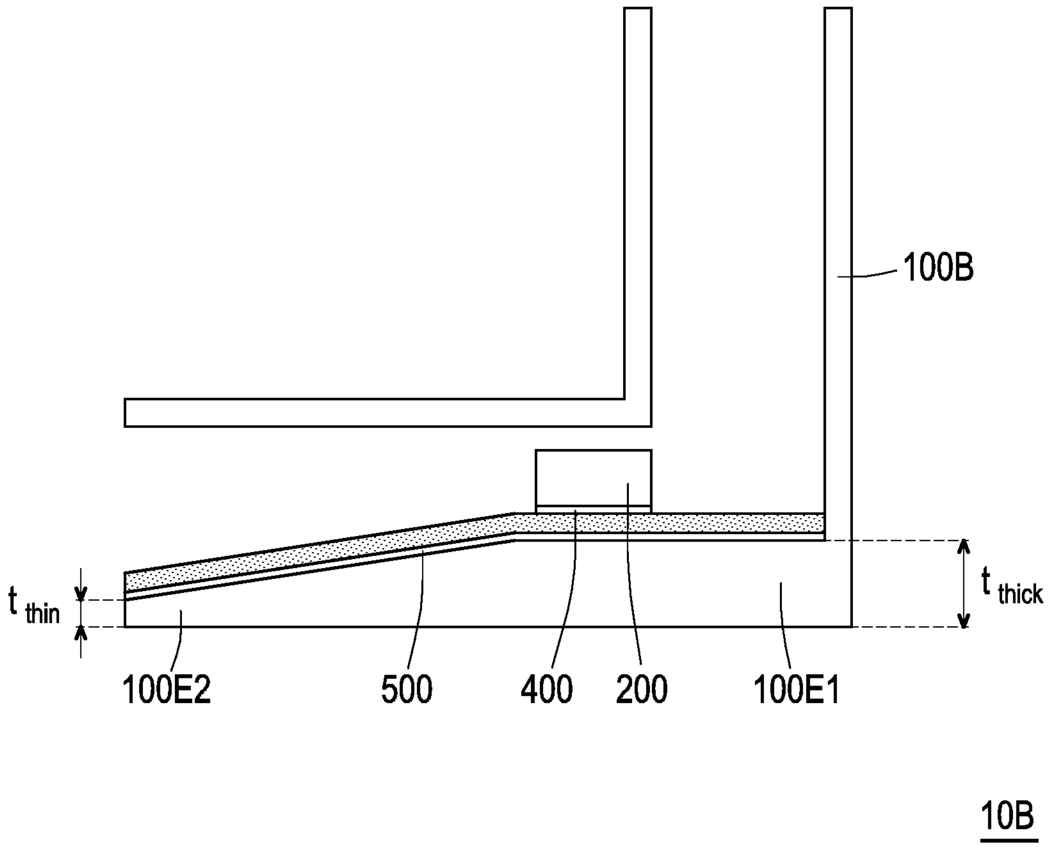
FIG. 3 is a top cross-sectional schematic view of a head-mounted display according to the third embodiment of the disclosure.

FIG. 3 is a top cross-sectional schematic view of a head-mounted display according to the third embodiment of the disclosure. Please refer to FIG. 3. A head-mounted display 10B is similar to the head-mounted display 10, and the main differences are as follows. In this embodiment, the thermally conductive material layer 300 of the head-mounted display 10B is disposed on other parts of the case body 100B, for example, disposed on a side of a lens frame part of the case body 100B away from a spectacle frame leg part. The advantages of the head-mounted display 10B are similar to the head-mounted display 10, and will not be repeated here.

Figure 4:
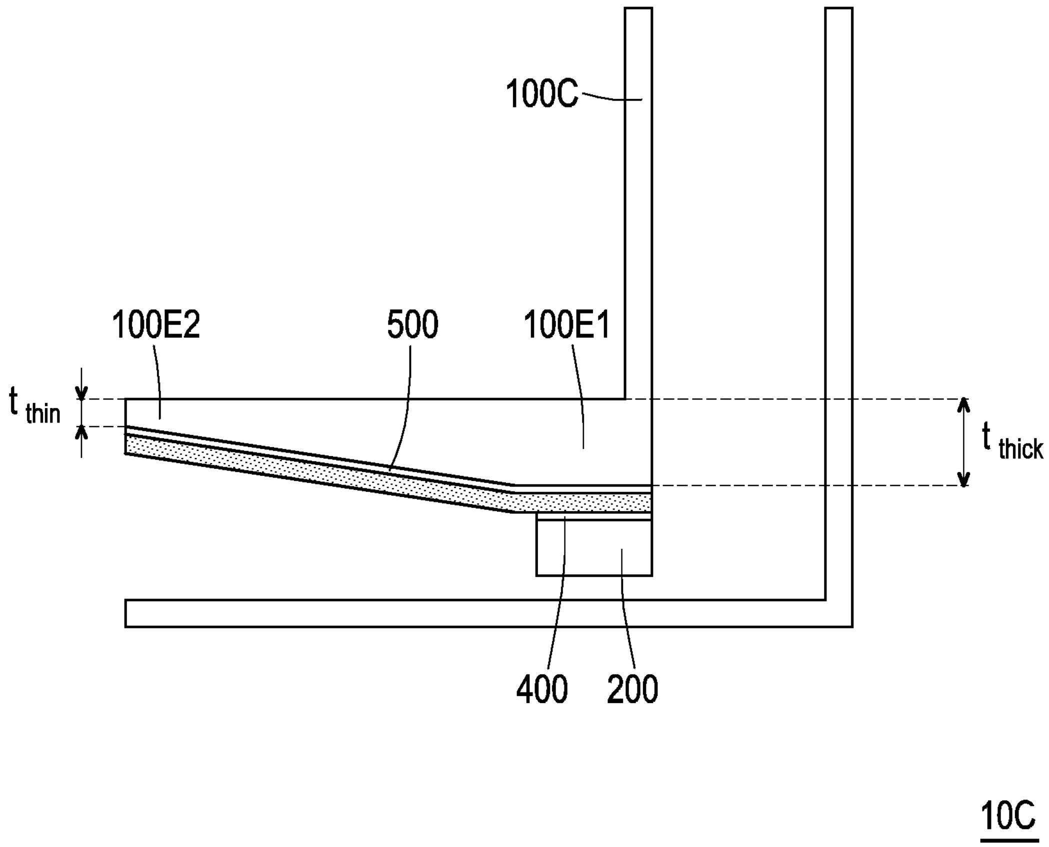
FIG. 4 is a top cross-sectional schematic view of a head-mounted display according to the fourth embodiment of the disclosure.

FIG. 4 is a top cross-sectional schematic view of a head-mounted display according to the fourth embodiment of the disclosure. Please refer to FIG. 4. A head-mounted display 10C is similar to the head-mounted display 10B, and the main differences are as follows. In this embodiment, the thermally conductive material layer 300 of the head-mounted display 10C is disposed on other parts of the case body 100C, for example, disposed on a side of a lens frame part of the case body 100C adjacent to a spectacle frame leg part. The advantages of the head-mounted display 10C are similar to the head-mounted display 10B, and will not be repeated here.

Figure 5:
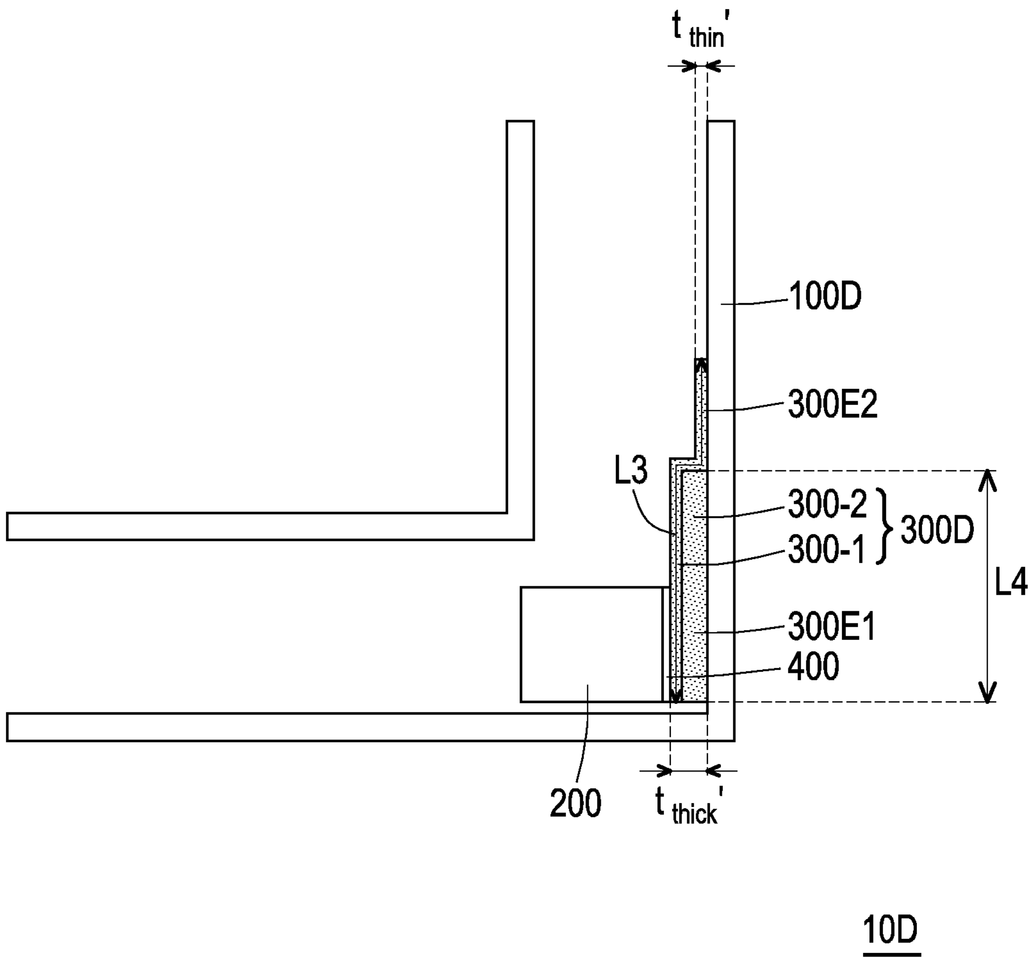
FIG. 5 is a top cross-sectional schematic view of a head-mounted display according to the fifth embodiment of the disclosure.

FIG. 5 is a top cross-sectional schematic view of a head-mounted display according to the fifth embodiment of the disclosure. Please refer to FIG. 5. A head-mounted display 10D is similar to the head-mounted display 10, and the main differences are as follows. In this embodiment, a case body 100D of the head-mounted display 10D has a constant thickness at the connection point with a thermally conductive material layer 300D. The thickness of the thermally conductive material layer 300D adjacent to the heat source 200 is greater than a thickness of the thermally conductive material layer 300D away from the heat source 200. That is to say, a thickness $t_{thick}'$ of the thermally conductive material layer 300D at a third end 300E1 is greater than a thickness $t_{thin}'$ at a fourth end 300E2, the third end 300E1 is an end of the thermally conductive material layer 300D adjacent to the heat source 200, and the fourth end 300E2 is an end of the thermally conductive material layer 300D away from the heat source 200.

In this embodiment, the thermally conductive material layer 300D includes multiple sub-thermally conductive material layers 300-1 and 300-2, in which a length L3 of the sub-thermally conductive material layer 300-1 adjacent to the heat source 200 is greater than or equal to a length L4 of the sub-thermally conductive material layer 300-2 away from the heat source 200. The length may be defined as a cumulative distance in a direction from the third end 300E1 of the thermally conductive material layer 300D to the fourth end 300E2.

Based on the above, in this embodiment, the thermally conductive material layer 300D of the head-mounted display 10D includes the multiple sub-thermally conductive material layers 300-1 and 300-2, and the head-mounted display 10D is designed such that the first distance d1 is greater than the second distance d2. Therefore, in addition to the head-mounted display 10D having the same advantages as the head-mounted display 10, disposing the multiple sub-thermally conductive material layers 300-1 and 300-2 further allows the head-mounted display 10D to have a thermal conductivity in the length direction being better than a thermal conductivity in the thickness direction (that is, the direction from the third surface 300S1 of the thermally conductive material layer to the second surface 100S2 of the case body), so that the overall effect of the temperature uniformity of the system is improved.

Figure 6:
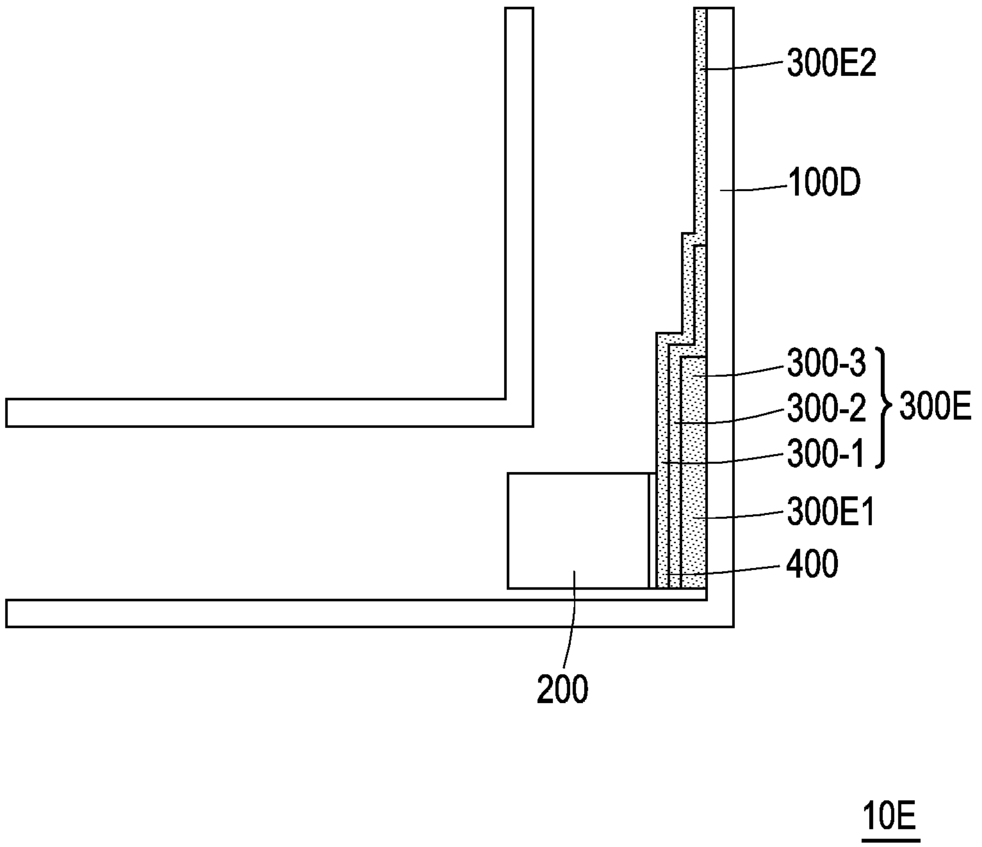
FIG. 6 is a top cross-sectional schematic view of a head-mounted display according to the sixth embodiment of the disclosure.

FIG. 6 is a top cross-sectional schematic view of a head-mounted display according to the sixth embodiment of the disclosure. Please refer to FIG. 6. A head-mounted display 10E is similar to the head-mounted display 10D, and the main differences are as follows. In this embodiment, a thermally conductive material layer 300E of the head-mounted display 10E includes multiple sub-thermally conductive material layers 300-1, 300-2, and 300-3. The advantages of the head-mounted display 10E are similar to the head-mounted display 10D, and will not be repeated here.

In summary, in the head-mounted display according to an embodiment of the disclosure, since the heat source is connected to the case body through the thermally conductive material layer and the head-mounted display is designed such that the first distance is greater than the second distance, the head-mounted display improves the situation of uneven system temperature, so that the internal heat can be uniformly distributed to the case body and further the head-mounted display is enabled to meet the production regulations.

The foregoing description of the preferred embodiments of the disclosure has been presented for purposes of illustration and description. It is not intended to be exhaustive or to limit the disclosure to the precise form or to the exemplary embodiments disclosed. Accordingly, the foregoing description should be regarded as illustrative rather than restrictive. Surely, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the disclosure” does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use “first”, “second”, etc. following with nouns or elements. Such terms should be understood as a nomenclature and should not be construed as giving the limitation on the number of the elements modified by such nomenclature unless a specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the appended claims. Moreover, no element or component in the disclosure is intended to be dedicated to the public regardless of whether the element or component is explicitly recited in the appended claims.

What is claimed is:

1. A head-mounted display, comprising:

a case body;

a heat source; and a thermally conductive material layer, wherein the heat source and the thermally conductive material layer are disposed in the case body, and the heat source is connected to the case body through the thermally conductive material layer, wherein the case body has a first surface connected to the thermally conductive material layer and an opposite second surface;

the thermally conductive material layer has a third surface connected to the heat source and an opposite fourth surface;

a first distance is greater than a second distance, wherein the first distance is a distance between the third surface and the second surface adjacent to the heat source, and the second distance is a distance between the third surface and the second surface away from the heat source; and a thickness of the case body at a first end is greater than a thickness of the case body at a second end, wherein the first end is an end of the case body adjacent to the heat source, and the second end is an end of the case body away from the heat source.

2. The head-mounted display according to claim 1, wherein a length of the thermally conductive material layer is greater than or equal to a length of the heat source, and a width of the thermally conductive material layer is greater than or equal to a width of the heat source.

3. The head-mounted display according to claim 1, further comprising a first thermal interface material layer disposed between the thermally conductive material layer and the heat source.

4. The head-mounted display according to claim 1, further comprising a second thermal interface material layer disposed between the thermally conductive material layer and the case body.

5. The head-mounted display according to claim 1, wherein the head-mounted display satisfies the following conditional formula: $1 \geq R_{thick}/(R_{thin}+R_{th}) > R_{thin}/(R_{thin}+R_{th})$, wherein $R_{thick}$ is a thermal resistance of the case body at the first end, $R_{thin}$ is a thermal resistance of the case body at the second end, and $R_{th}$ is a thermal resistance of the thermally conductive material layer in a length direction.

6. The head-mounted display according to claim 1, wherein the thickness of the case body gradually decreases from the first end to the second end.

7. The head-mounted display according to claim 1, wherein the thickness of the case body decreases linearly from the first end to the second end.

8. The head-mounted display according to claim 1, wherein a thickness of the thermally conductive material layer adjacent to the heat source is greater than a thickness of the thermally conductive material layer away from the heat source.

9. A head-mounted display, comprising:

a case body;

a heat source; and a thermally conductive material layer, wherein the heat source and the thermally conductive material layer are disposed in the case body, and the heat source is connected to the case body through the thermally conductive material layer, wherein the case body has a first surface connected to the thermally conductive material layer and an opposite second surface;

the thermally conductive material layer has a third surface connected to the heat source and an opposite fourth surface;

a first distance is greater than a second distance, wherein the first distance is a distance between the third surface and the second surface adjacent to the heat source, and the second distance is a distance between the third surface and the second surface away from the heat source; and a thickness of the thermally conductive material layer adjacent to the heat source is greater than a thickness of the thermally conductive material layer away from the heat source, wherein the thermally conductive material layer comprises a plurality of sub-thermally conductive material layers, and a length of the sub-thermally conductive material layer adjacent to the heat source is greater than or equal to a length of the sub-thermally conductive material layer away from the heat source.

* * * * *